(12) United States Patent
Nishimura

(10) Patent No.: US 6,693,263 B2
(45) Date of Patent: Feb. 17, 2004

(54) CONVECTION TYPE BRAZING APPARATUS FOR METAL WORKPIECES

(75) Inventor: Makoto Nishimura, Tokyo (JP)

(73) Assignee: Oak Nippon Co., Ltd., Tokyo (JP)

( * ) Notice: Subject to any disclaimer, the term of this patent is extended or adjusted under 35 U.S.C. 154(b) by 0 days.

(21) Appl. No.: 10/305,969

(22) Filed: Nov. 29, 2002

(65) Prior Publication Data
US 2003/0111459 A1 Jun. 19, 2003

(30) Foreign Application Priority Data
Nov. 28, 2001 (JP) .......................... 2001-361861
Sep. 10, 2002 (JP) .......................... 2002-263552

(51) Int. Cl.[7] .............................. H05B 6/10; F27D 3/00
(52) U.S. Cl. ................. 219/615; 219/628; 219/651; 432/25; 432/57; 228/234.1
(58) Field of Search .................. 219/615, 616, 219/617, 602, 628, 629, 651, 656, 85.1, 400; 432/11, 14, 25, 51, 57, 93, 221; 228/46, 227, 234.1

(56) References Cited

U.S. PATENT DOCUMENTS 3,685,139 A * 8/1972 Early et al. .............. 228/234.1
5,172,847 A * 12/1992 Barten et al. .................. 228/18
5,660,543 A * 8/1997 Marks et al. ................ 432/152
2001/0051323 A1 * 12/2001 Nishimura .................... 432/11

* cited by examiner

Primary Examiner—Philip H. Leung
(74) Attorney, Agent, or Firm—Browdy and Neimark, P.L.L.C.

(57) ABSTRACT

The invention provides a convection type brazing apparatus for metal workpieces such as aluminum, copper, iron and so forth that enables uniform heating of the metal workpieces to prevent deformation of the workpieces and can shorten a heating time to achieve a higher operation efficiency. A heating medium gas heated by a tube heater 36 in a thermal medium gas heating chamber 45 is forwarded by a fan 37 to manifolds 41A and 41B located on both left and right sides, to be blown through a multitude of nozzles 43 toward workpieces W to which a brazing material and flux have been applied in advance. Once the workpieces temperature has reached a predetermined temperature for brazing, a switching valve located in an upper duct 48 is activated so that the heating medium gas is intermittently blown to the workpieces. As a result, a temperature slope of the workpieces is minimized and uniform brazing can be performed.

14 Claims, 15 Drawing Sheets

HEATING MEDIUM GAS INJECTING NOZZLES
ACTUALLY MEASURED FLOW VELOCITY OF HEATING MEDIUM GAS (m/sec.)

| VERTICAL ROWS | | HORIZONTAL ROWS | | | | | | |
|---|---|---|---|---|---|---|---|---|
| | | No.1 | No.2 | No.3 | No.4 | No.5 | No.6 | No.7 |
| LEFT | A | 13 | 13 | 13 | 14 | 13.5 | 13 | 13 |
| | B | 12.5 | 12.5 | 12.5 | 13 | 13 | 12.5 | 12 |
| | C | 12.5 | 12.5 | 12.5 | 13 | 13 | 12 | 12.5 |
| | D | 13 | 12.5 | 13 | 14 | 13.5 | 12.5 | 13 |
| | E | 14 | 13 | 14 | 14.5 | 14 | 13 | 12.5 |
| RIGHT | A | 12.5 | 12 | 12.5 | 12 | 13 | 12 | 12.5 |
| | B | 12 | 11.5 | 12 | 12.5 | 12 | 11.5 | 12 |
| | C | 11.5 | 11 | 11.5 | 12.5 | 12 | 11.5 | 12 |
| | D | 12 | 11.5 | 12.5 | 13 | 13 | 11.5 | 12.5 |
| | E | 13 | 12.5 | 13 | 14 | 13.5 | 12 | 13.5 |

Fig. 15

CONVECTION TYPE BRAZING APPARATUS FOR METAL WORKPIECES

BACKGROUND OF THE INVENTION

1. Field of the Invention

The present invention relates to a brazing apparatus for metal workpieces such as aluminum, copper, copper alloys, iron or stainless steel and so forth in which a convection type furnace (thermal convection furnace) is employed, more specifically to a brazing apparatus for brazing aluminum parts on large-sized aluminum workpieces such as a heat exchanger for an automobile, utilizing an index type (intermittent motion type) convection furnace.

2. Description of the Related Art

A convection furnace for brazing large-sized metal workpieces made of aluminum such as a heat exchanger for an automobile etc. is generally designed to heat the workpieces fixed or carried within a brazing chamber, by circulating using a fan etc. inside the brazing chamber a heating medium gas composed of an inactive gas for example nitrogen gas etc. heated in a combustion chamber.

Brazing temperature varies depending on metal materials, brazing materials and types of flux, and normally it is 550° C. to 640° C. for brazing aluminum of AA1000 series with a fluoride flux, and 700° C. to 850° C. for copper and stainless steel.

For example, brazing temperature for aluminum of AA1100 with aluminum of AA4045 or 4047 as brazing material and a fluoride as flux is approx. 600° C. In a convection type brazing furnace, workpieces are usually heated up to approx. 350° C. in a preheating furnace. The workpieces carried into a brazing chamber of the brazing furnace is rapidly heated by heating medium gas heated to approx. 610° C. to 620° C., so that the workpieces temperature is raised up to 600° C. in several minutes.

Normally such temperature is maintained during the heating to fuse the flux and to complete the brazing, however despite maintaining the furnace temperature at 600° C. by controlling the heating medium gas temperature, a temperature slope of 30° C. to 40° C. is generated among the surface of the workpieces which the heating medium gas directly hits, the opposite side thereof and interior sections of the workpieces, because of which a flow of the brazing material becomes uneven, and resultantly brazing quality is lowered.

The inventors of the present invention proposed method and an apparatus by which workpieces temperature can be made uniform and a high-quality brazing can be executed, wherein temperature of heating medium gas to be applied to the workpieces in a convection type brazing furnace is varied up and downward in small increments (hereinafter referred to as "pulse heating") during a temperature raising process and after reaching a predetermined brazing temperature. (Ref. JP-A No.2001-340958: U.S. Pat. No. 2001-0051323)

However, according to the convection type brazing furnace disclosed in JP-A No.2001-340958 wherein heating medium gas temperature is varied up and downward to perform the pulse heating, lowering the heating medium gas temperature does not instantly lower the brazing chamber temperature because of a large thermal capacity of the brazing chamber itself, therefore it takes some time before reaching a desired temperature. Likewise, when the heating medium gas temperature is raised also, there is a certain time lag before the brazing chamber temperature reaches a desired level.

Because of the inadequate thermal response, by the conventional method of varying the heating medium gas temperature up and downward it is difficult to shorten a cycle time (cycle of high-temperature heating and low-temperature heating) of the pulse heating, therefore a brazing time inevitably becomes longer, resulting in a lower productivity.

In view of the foregoing, it is an object of the invention to provide a convection type brazing apparatus for metal workpieces that can shorten an operation time for brazing metal workpieces such as aluminum, copper, copper alloys, iron or stainless steel and so forth to achieve a higher productivity, and enables uniform heating of the workpieces to improve a yield of products.

SUMMARY OF THE INVENTION

As a result of persistent studies for achieving the mentioned object, the inventors of the present invention have discovered that in a brazing operation for metal workpieces such as aluminum, copper, copper alloys, iron or stainless steel, etc. utilizing a convection furnace, intermittently supplying heating medium gas can effectively shorten a cycle time of the pulse heating and minimize a temperature slope of the workpieces especially large-sized workpieces, and further shorten the brazing operation time to improve productivity.

Accordingly, the invention provides a convection type brazing apparatus for metal workpieces having a brazing furnace provided with at least a thermal medium gas heating chamber, a brazing chamber and a heating medium gas circulation path through which the heating medium gas heated in the thermal medium gas heating chamber returns to the thermal medium gas heating chamber via the brazing chamber, comprising a heating medium gas circulation path switching mechanism for periodically switching the heating medium gas circulation path so that a blowing phase during which the heating medium gas heated in the thermal medium gas heating chamber is blown into the brazing chamber and a suspension phase during which blow of the heating medium gas into the brazing chamber is suspended are alternately repeated; and a bypass circulation path through which the heating medium gas returns directly to the thermal medium gas heating chamber halfway of the heating medium gas circulation path without running through the brazing chamber during the suspension phase.

For the heating medium gas circulation path switching mechanism, an ordinary switching valve such as a damper valve, slide valve, butterfly valve, etc. may be employed. Also, though the heating medium gas circulation path switching mechanism can have separate valves in the heating medium gas circulation path and the bypass circulation path, it is more economical to provide a single valve to be used in common for switching the both circulation paths.

Also, the heating medium gas circulation path switching mechanism comprises means for controlling for closing the bypass circulation path while the heating medium gas circulation path is opened during the blowing phase and opening the bypass circulation path while the heating medium gas circulation path is closed during the suspension phase.

The heating medium gas circulation path switching mechanism controlling means is provided with a function to set a cycle time of the blowing phase and the suspension phase of the heating medium gas circulation path in a range of 5 seconds to 5 minutes.

In an ordinary convection furnace with a capacity of 1 cubic meter, a normal time range of the suspension phase is 5 seconds to 5 minutes, most preferably approx. 10–30 seconds. If the suspension phase is too short it is difficult to lower the heating medium gas temperature to a desired level. On the contrary if it is too long total operation time is undesirably prolonged, though workpieces may have a better finish.

Also, for adjusting the furnace temperature, it is effective to vary a time ratio of the blowing phase and suspension phase of the heating medium. For example, in case where the furnace temperature exceeds a preset value a time ratio of the blowing phase is reduced, while when the furnace temperature becomes less than the preset value the time ratio of the blowing phase is increased.

For such purpose, the heating medium gas circulation path switching mechanism controlling means comprises means for correction for executing feedback control of a ratio of the blowing phase and the suspension phase in accordance with a temperature inside the brazing chamber.

The control correction means is provided with a sensor for detecting the furnace temperature and a programmable controller for varying the time ratio of the blowing phase and suspension phase according to the furnace temperature detected by the sensor. A preferable range of the time ratio of the blowing phase and suspension phase is 30:70 to 70:30.

According to the invention the heating medium gas is intermittently supplied at short intervals to perform the pulse heating, however a short-time suspension phase does not instantly lower the brazing chamber temperature because of a large thermal capacity of the brazing chamber. Therefore, it is effective to provide the brazing chamber with means for introducing cooling medium gas, by which a cooling medium gas is introduced into the brazing chamber during the suspension phase, for lowering the brazing chamber temperature in a short time to increase the effect of the pulse heating.

A low-temperature gas such as cooled carbon dioxide gas, nitrogen gas, argon gas, dried air, etc. may be used as cooling medium gas, among which the low-temperature nitrogen gas obtained by evaporating liquid nitrogen gas is most preferable, because of its low dew point (lower than −50° C. when the gas temperature is 30° C.).

The cooling medium gas introducing means comprises one or a plurality of nozzles disposed on an inner wall of the brazing chamber, for introducing a low-temperature cooling medium gas of 20° C. to 50° C. evaporated in a storing container of the cooling medium gas such as liquid nitrogen. In some applications, means for blowing the heating medium gas may be utilized as the cooling medium gas introducing means also.

The cooling medium gas introducing means also comprises means for controlling cooling medium gas flow, so that the cooling medium gas is introduced into the brazing chamber only during the suspension phase of the heating medium gas. Control of timing for introducing the cooling medium gas into the brazing chamber and of a flow of the cooling medium gas is executed by an electromagnetic valve connected with a programmable controller.

Also, for promoting a temperature drop in the brazing chamber during the suspension phase, the brazing chamber further comprises means for discharging exhaust heating gas, to be activated during the suspension phase of the blow of the heating medium gas.

The exhaust heating gas discharging means comprises an aspirator provided with a venturi tube to be operated by compressed air located on the outlet side of a discharging tube having an opening in the brazing chamber. The aspirator, which can lower the brazing chamber temperature in a short time by rapidly discharging hot air out of the brazing chamber during the suspension phase, can be operated at a substantially low running cost.

In the thermal medium gas heating chamber, it is preferable to provide a tube heater having a heat source of a fluid fuel, as means for heating the thermal medium gas composed of an inactive gas such as nitrogen etc. Usually the tube heater is heated by a gas burner with which a fuel gas such as propane is used, while naturally a liquid fuel burner can also be employed.

It is also preferable to employ a hydrogen gas burner in which hydrogen and oxygen are used, for heating the tube heater. The hydrogen gas and oxygen gas can be easily supplied to the hydrogen gas burner by installing a water electrolyzation device. Further, since a hydrogen gas burner does not generate a combustion exhaust gas such as carbon dioxide, sulfur oxide, nitrogen oxide or dust etc., using a hydrogen gas burner is also preferable from an environmental viewpoint.

An electric heater may also be employed as a heat source for the tube heater. Referring to a type of the electric heater, it is preferable to use a sheath heater or a coil heater.

Further, the thermal medium gas heating chamber may comprise a high-frequency induction heating device having a multitude of radiating projections, as means for heating the heating medium gas. The high-frequency induction heating device employed for such purpose is based on a similar principle and of a substantially similar constitution to that of an air-cooling heat sink for cooling a semiconductor device etc.

The heat sink transfers heat of a heating element of a semiconductor device etc. through the air for cooling the semiconductor device etc., while the high-frequency induction heating device according to the invention heats a metal heating plate with an electromagnetic coil, and transfers the heat to the thermal medium gas through the metal radiating projections, thus to heat the thermal medium gas.

The high-frequency induction heating device is more advantageous from the viewpoint of prevention of pollution than the tube heater since it does not generate exhaust gas, and enables easy and accurate control of the heating medium gas temperature simply by on/off operation of a high-frequency power source, therefore it is extremely advantageous to employ the high-frequency induction heating device as heat source in the uniform heating process according to the invention.

The heating plate of the high-frequency induction heating device may be constituted with a metal plate having a high thermal conductivity such as copper or aluminum etc. and a multitude of radiating projections of the same material attached the metal plate. The electromagnetic coil may be a metal coil of copper etc. connected with the high-frequency power source. Constituting the metal coil in a form of a hollow pipe and supplying cooling water through such pipe can generate a high power of 1 to 5 kw.

Shape of the radiating projections may be arbitrarily determined including bar-shape, plate-shape etc., while it is preferable to employ corrugated fins. Also, it is preferable to arrange the projections for example in a hound's tooth pattern, so that a longer contact time can be secured with the thermal medium gas.

The thermal medium gas heating chamber is provided with an ordinary blower as means for blowing heating medium gas. A rotary wing fan of either forced draft type or suction draft type may be employed as a blower, among which a forced draft fan such as a turbo fan is preferably employed.

The heating medium gas blowing means is attached to an inner wall of the brazing chamber and comprises a multitude of nozzles directed toward the workpieces. Number of nozzles may vary depending on the dimensions of the brazing chamber, while it is preferable to provide 30 to 200 pieces on one side, i.e. 60 to 400 pieces on both sides for a dual-blowing type brazing chamber. Also it is preferable to arrange the nozzles regularly, for example in a check, hound's tooth or concentric pattern when the wall is of a square shape.

Each nozzle of said heating medium gas blowing means is constructed so that the blowing direction of said heating medium gas can be adjusted freely. With concrete, the neck swing nozzle can be used in which it is possible to turn the neck portion 380 degrees.

When the blowing directions of all or a part of the nozzles being on the inner wall surface of the brazing chamber are turned to the specific area of workpieces, it can be heated concentrated the specific area of workpieces. When the blowing directions of all or a part of nozzles of both sides of the brazing chamber are deflected for 10–20 degrees against the inner wall surface, a rotational flow of the heating medium gas is produced in the brazing chamber, as the result, the uniform heating of workpieces is realized.

The heating medium gas blowing means may be optionally disposed on each of the brazing chamber walls, in other words 1 to 6 units may be provided in case of a cubic brazing chamber. Still, it is recommendable to dispose two units of heating medium gas blowing means on opposing vertical walls of the brazing chamber, so that the heating medium gas is blown toward the workpieces from both left and right directions. Further, it is also preferable to add another heating medium gas blowing means that blows the heating medium gas from upper the workpieces, thus to constitute a tri-directional blow.

The heating medium gas blowing means may be disposed in more than four directions in case of a batch type furnace.

The nozzles of the heating medium gas blowing means are projecting into the furnace and have an opening of approx. 8 mm, and it has been experimentally proven that under such configuration the heating medium gas can be injected through these nozzles at a speed of 12 to 14 m/s in the ordinary temperature, and speed variation of the heating medium gas injected from the 30 to 200 pieces of nozzles per wall is minimal, which leads to a conclusion that such heating medium gas blowing method is remarkably effective for uniform heating of each side of the workpieces.

BRIEF DESCRIPTION OF THE DRAWINGS

FIG. 15 is a table showing actually measured values of flow velocity of heating medium gas injection nozzles.

DESCRIPTION OF THE PREFERRED EMBODIMENTS

Embodiment 1.

Figure 1:
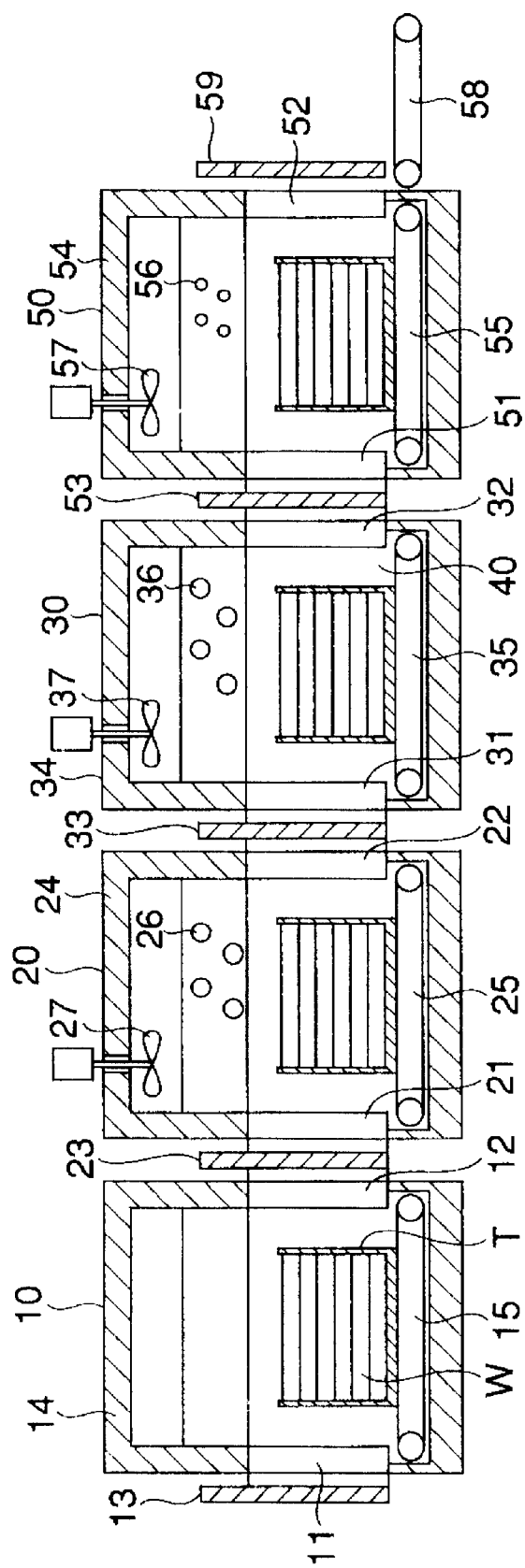
FIG. 1 is a vertical cross-sectional view of an entire convection type brazing apparatus according to an embodiment of the present invention.

FIG. 1 shows a convection type brazing apparatus according to an embodiment of the present invention, specifically an index type furnace provided with a drying furnace 10, a preheating furnace 20, a brazing furnace 30 and a cooling furnace 50 consecutively aligned.

The drying furnace 10 is constituted of a stainless steel furnace body 14 containing therewithin a refractory and provided with vertically moving shutters 13, 23 at an inlet 11 and an outlet 12 respectively. Workpieces W consisting of a main body and parts incorporated therein that have been clad with a brazing material in advance are stacked on a tray T and carried into the furnace by a belt conveyor 15 installed on a hearth. An inactive gas such as nitrogen that has a low dew point is blown into the drying furnace 10 through an introduction tube (not shown), so that the workpieces coated with a flux are dried.

The preheating furnace 20 is constituted of a heat-resistant stainless steel furnace body 24 containing therewithin a refractory and provided with vertically moving shutters 23, 33 at an inlet 21 and an outlet 22 respectively. The workpieces W stacked on the tray T are carried from the drying furnace 10 to the preheating furnace 20 by a belt conveyor 25 installed on the hearth. A fan 27 is circulating an inactive gas (heating medium gas) such as nitrogen etc. inside the preheating furnace 20. The heating medium gas is heated by a tube heater 26 up to approx. 400 to 450° C., so that the workpieces are preheated up to approx. 350° C.

The brazing furnace 30 is constituted of a furnace body 34 made of a heat-resistant alloy such as inconel etc. containing therewithin a refractory, and provided with vertically moving shutters 33, 53 at an inlet 31 and an outlet 32 respectively. The workpieces W stacked on the tray T are carried from the preheating furnace 20 to the brazing furnace 30 by a belt conveyor 35 installed on the hearth. A fan 37 is circulating a heating medium gas inside the brazing furnace 30. The heating medium gas heated up to approx. 610 to 620° C. by a tube heater 36 maintains the workpieces temperature at a brazing temperature of approx. 600° C., so that brazing can be executed.

The cooling furnace 50 is constituted of a stainless steel furnace body 54 containing therewithin a refractory and provided with vertically moving shutters 53, 59 at an inlet 51 and an outlet 52 respectively. The workpieces W stacked on the tray T that have been brazed are carried from the brazing furnace 30 to the cooling furnace 50 by a belt conveyor 55 installed on the hearth.

A fan 57 is circulating dry air and low-temperature nitrogen gas inside the cooling furnace 50, so that the workpieces temperature is lowered. Reference numeral 56 denotes a water-cooling pipe for lowering heating medium gas temperature to increase cooling efficiency of the workpieces. The cooled workpieces W are carried outside through the outlet 52 by a belt conveyor 58.

Figure 2:
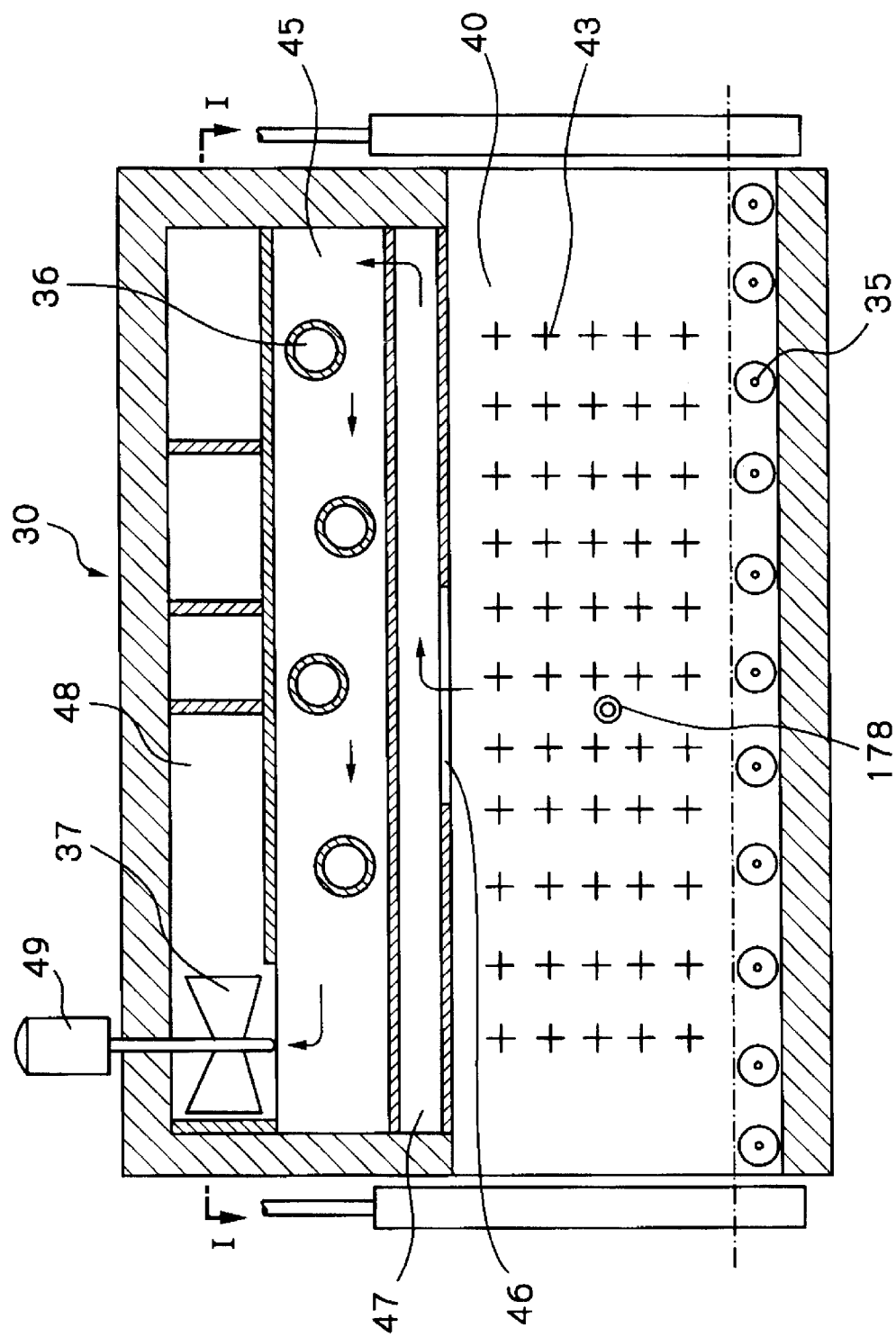
FIG. 2 is a vertical cross-sectional view of a brazing furnace taken along the lines III—III of FIG. 4.

FIG. 2 is a cross-sectional view of a brazing furnace 30, in which a brazing chamber 40 is provided at its furnace core. At a lower section of the brazing chamber 40 the belt conveyor 35 is installed for carrying the tray T on which the workpieces are stacked. At an upper section of the brazing chamber 40 a thermal medium gas heating chamber 45 is installed for heating therein a heating medium gas. A tube heater 36 is located in the thermal medium gas heating chamber 45 in a winding form.

Numeral 49 denotes a rotary motor for the fan 37, and 47 an intermediate duct serving as a path for guiding exhaust gas from an exhaust outlet 46 to the thermal medium gas heating chamber 45. Numeral 43 denotes heating medium gas injecting nozzles for injecting the heating medium gas heated in the thermal medium gas heating chamber 45 into the brazing chamber 40. The nozzles 43 are regularly arranged on a partition wall 42 and directed toward the workpieces W. In this embodiment 55 pieces of nozzles are aligned in a checked pattern formed by five horizontal rows and eleven vertical rows on one wall. Since there are two partition walls 42 as shown in FIG. 3, there are 110 pieces of nozzles in total.

Figure 3:
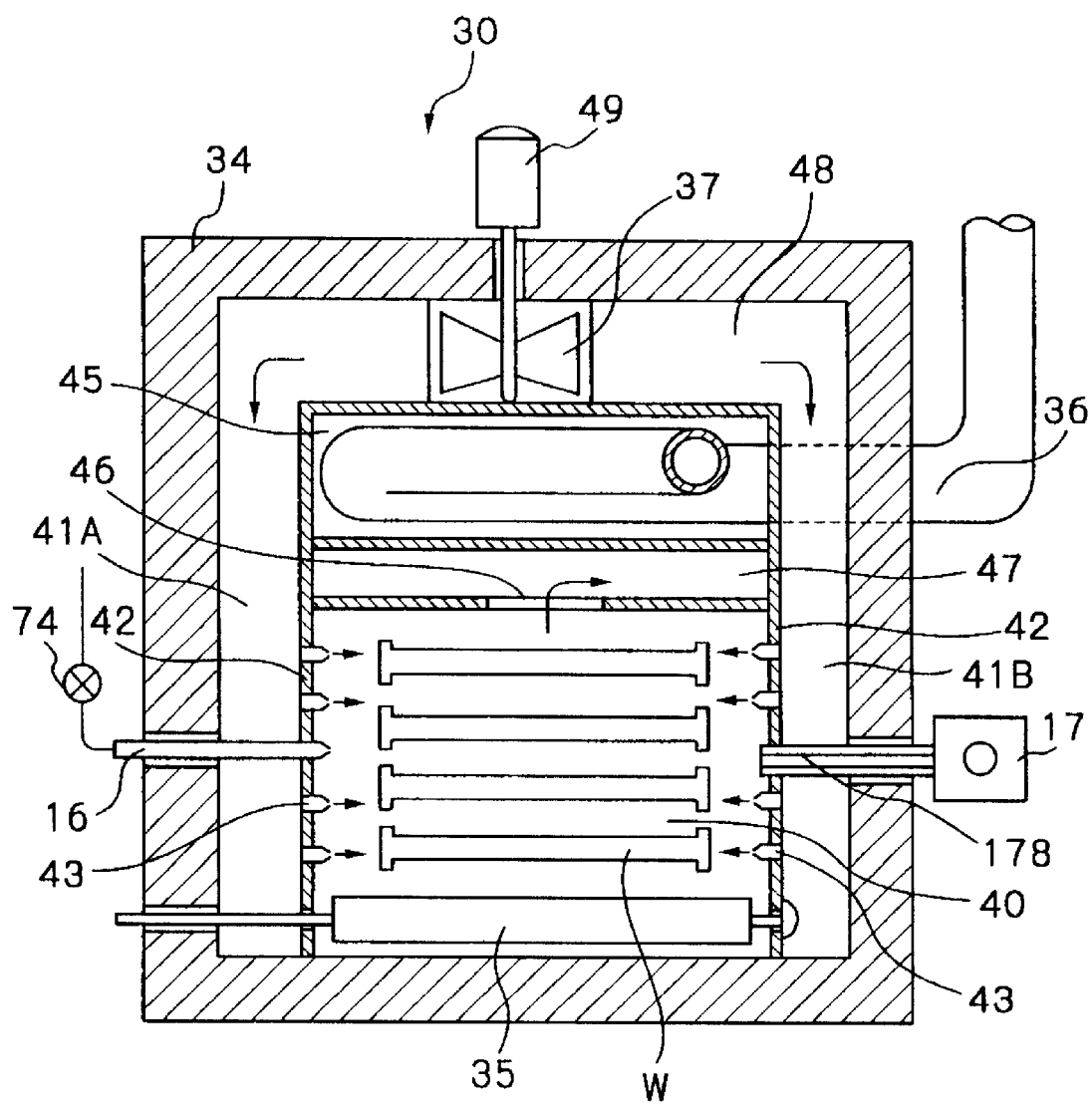
FIG. 3 is a vertical cross—sectional view of the brazing furnace taken along the lines II—II of FIG. 4.

Referring to FIG. 3, numerals 41A, 41B denote manifolds separated by the partition wall 42, for accumulating therein the heating medium gas supplied by the fan 37 through a duct 48, and forcefully injecting the heating medium gas through the nozzles 43 toward the workpieces W. 16 is an injecting nozzle of cooling medium gas, and 17 an aspirator for aspirating and discharging the heating medium gas from inside the brazing chamber 40. Also, 178 is a suction pipe for the aspirator.

Figure 4:
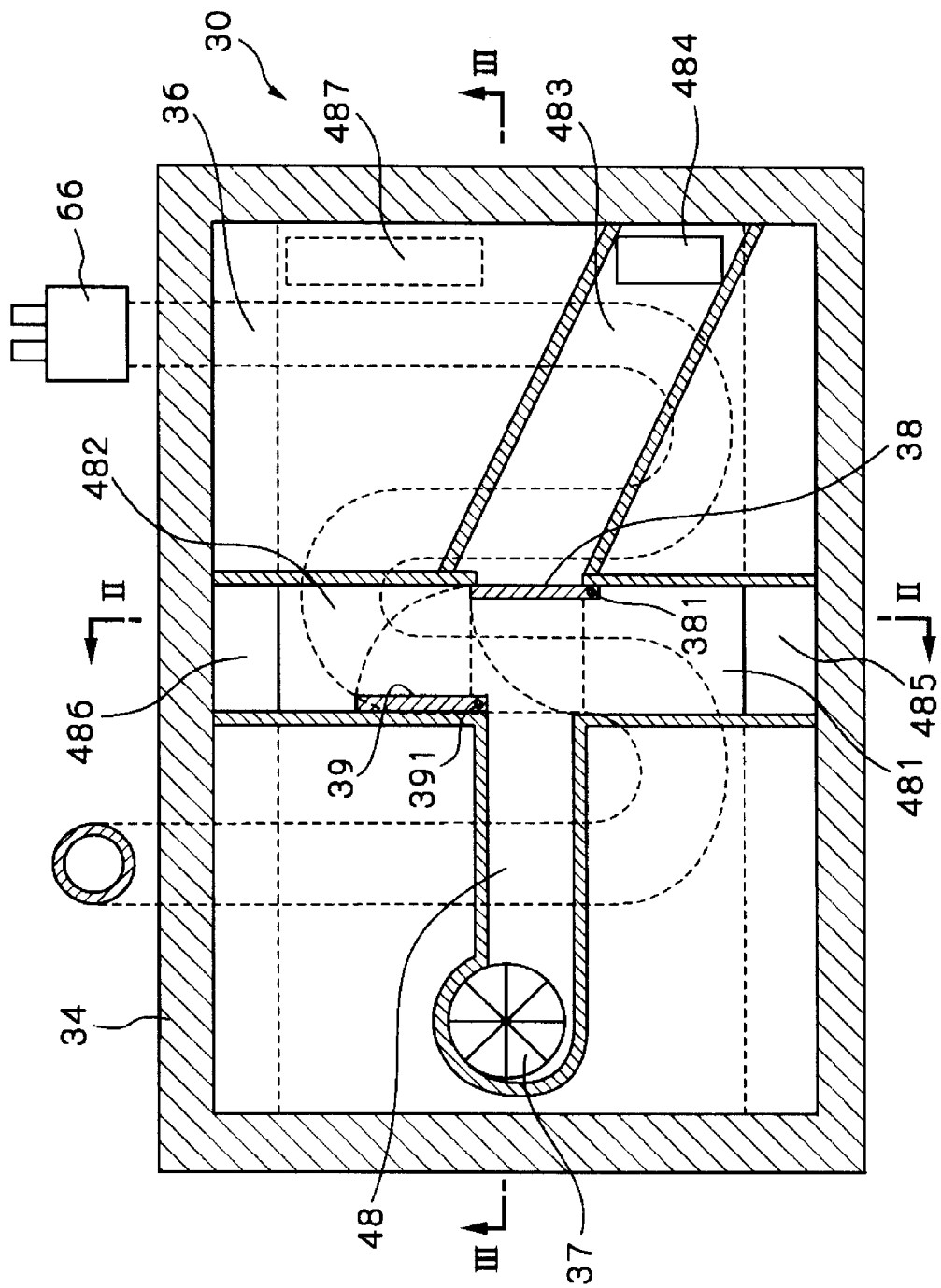
FIG. 4 is a horizontal cross—sectional view of the brazing furnace taken along the lines I—I of FIG. 2.

FIG. 4 is a horizontal cross-sectional view of the brazing furnace 30, in which numeral 48 denotes an upper duct for carrying therethrough the heating medium gas supplied by the fan 37, which is branched halfway in three directions, i.e. ducts 481, 482 and 483. 38 and 39 are switching valves designed to turn around the respective rotational axles 381 and 391 as shown in the drawing.

When the switching valves 38, 39 are at the positions shown by the solid lines in the drawing, the heating medium gas supplied from the upper duct 48 is branched to the ducts 481, 482 on the left and right, and respectively supplied to the left and right manifolds 41A, 41B through communicating paths 485, 486. When the switching valves are turned to the position shown by the dotted lines-the upper duct 48 becomes directly connected with the duct 483, so that the heating medium gas is supplied to the thermal medium gas heating chamber 45 through a communicating path 484.

Numeral 66 denotes a gas burner for the tube heater 36, and 487 a communicating path located between the intermediate duct 47 and the thermal medium gas heating chamber 45.

Figure 5:
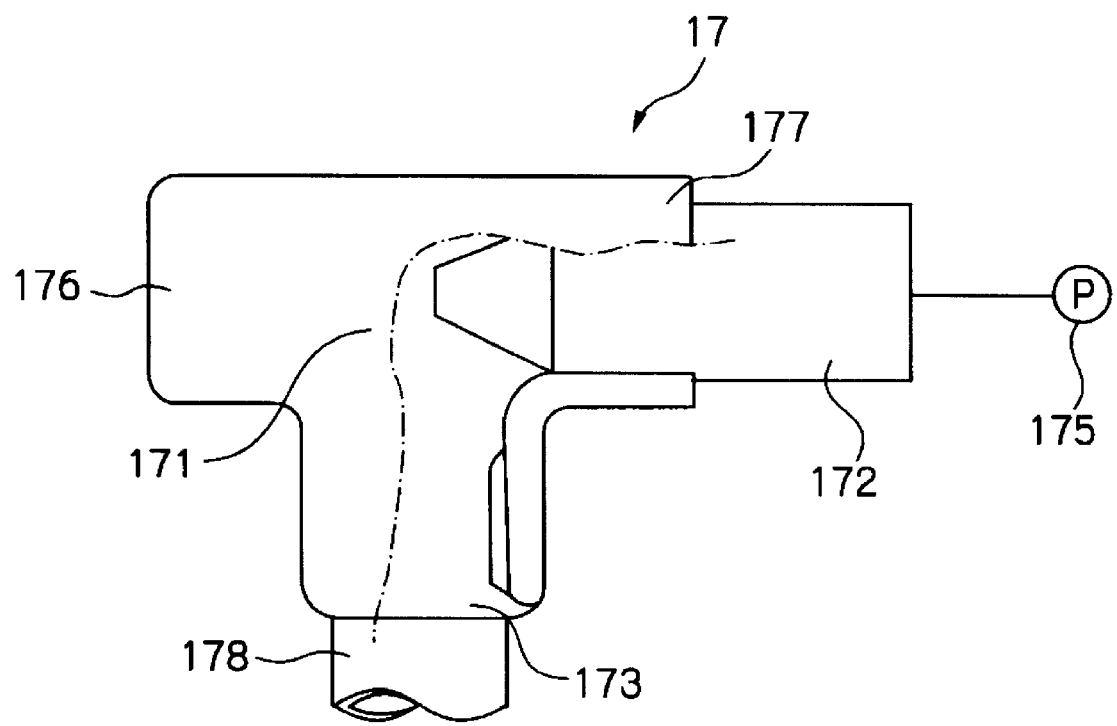
FIG. 5 is a partially cross-sectional view of an aspirator of exhaust gas.
Figure 6:
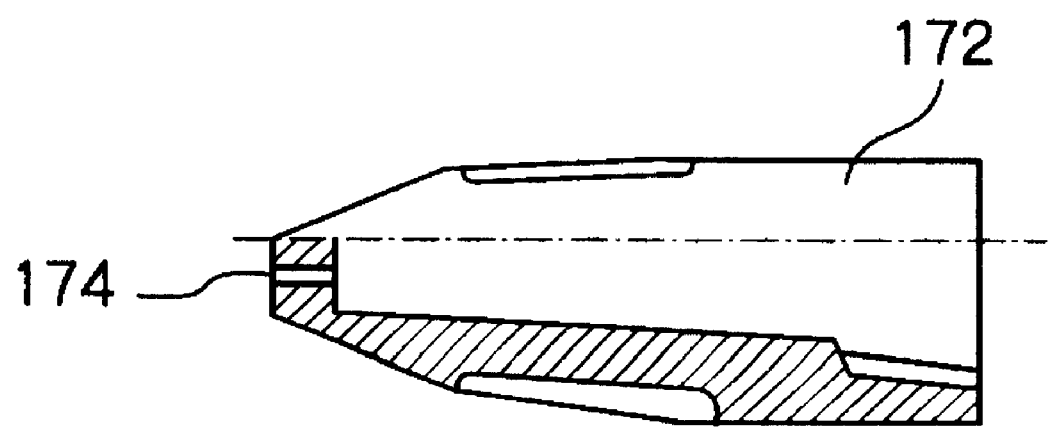
FIG. 6 is a partially cross-sectional view of an injection nozzle of the aspirator of exhaust gas.

FIG. 5 shows the aspirator 17, constituted of a T-shape pipe 171 having three openings 173, 176 and 177. The suction pipe 178 communicating with the brazing chamber 40 is connected to the opening 173. An injecting nozzle 172 is inserted to the opening 177. The opening 176 serves as a gas discharging outlet. An air pump 175 is connected with the injecting nozzle 172 for supplying compressed air. The compressed air is injected into the T-shape pipe 171 through an opening 174 (in FIG. 6) provided at the tip of the injecting nozzle 172, and a negative pressure is generated. Because of the negative pressure high-temperature heating medium gas in the brazing chamber 40 is aspirated through the suction pipe 178 and discharged.

Now, flow of the heating medium gas shall be described.

<Blowing Phase>

The heating medium gas heated in the thermal medium gas heating chamber 45 by the tube heater 36 is aspirated by rotation of the fan 37 into the upper duct 48, and branched to the left and right ducts 481, 482 to reach the left and right manifolds 41A, 41B. The heating medium gas in the manifolds 41A, 41B is then injected through the left and right nozzles 43 into the brazing chamber 40 so that the workpieces W are heated. Exhaust gas that has heated the workpieces flows to the intermediate duct 47 through the discharging outlet 46, to finally return to the thermal medium gas heating chamber 45 through the communicating path 487. Upon being heated here, the heating medium gas is again aspirated by the fan 37 for recirculation.

<Suspension Phase>

The heating medium gas heated in the thermal medium gas heating chamber 45 by the tube heater 36 is aspirated by rotation of the fan 37 into the upper duct 48, and flows to the duct 483 that is a bypass circulation path, to return to the thermal medium gas heating chamber 45 through the communicating path 484. Thus the heating medium gas is not supplied to the brazing chamber 45 during the suspension phase, but is circulated between the thermal medium gas heating chamber 45 and the fan 37. In addition, during the suspension phase cooling medium gas is blown into the brazing chamber 40 through the cooling medium gas injecting nozzle 16, and the aspirator 17 is activated to aspirate and remove the high-temperature heating medium gas out of the brazing chamber 40, so that the brazing chamber temperature can rapidly drop.

Figure 7:
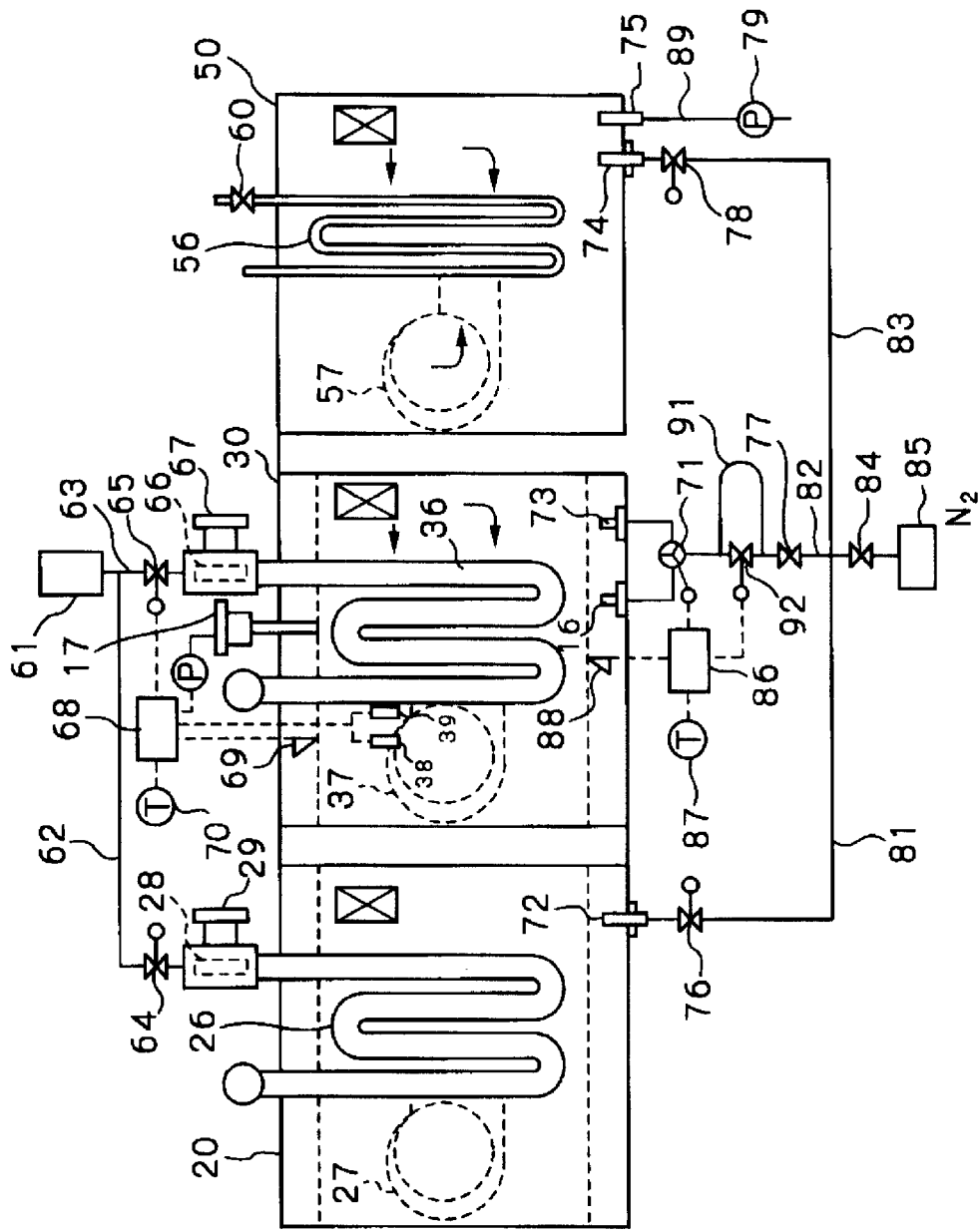
FIG. 7 is a schematic plan view of a preheating furnace, a brazing furnace and a cooling furnace.
Figure 8:
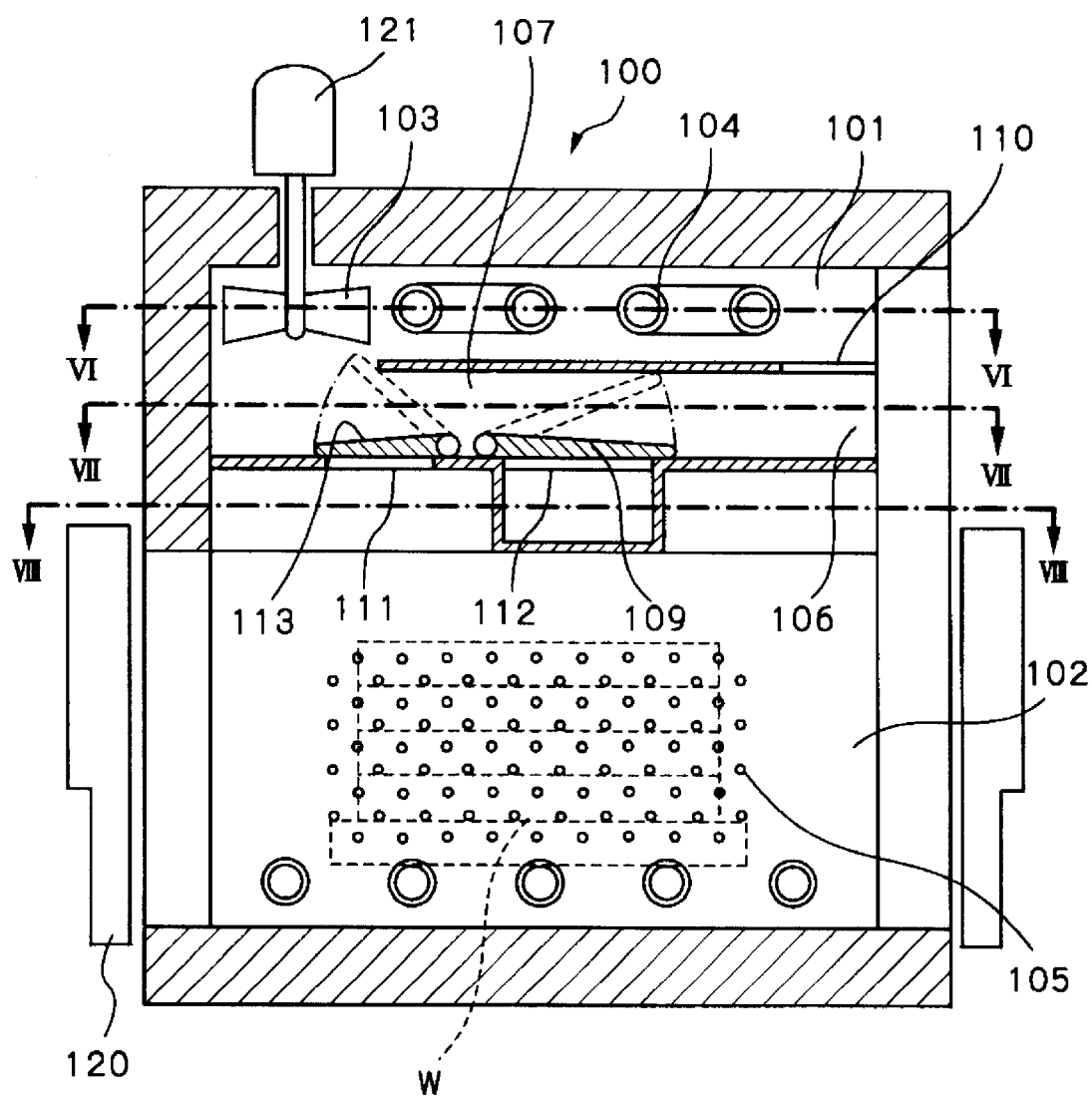
FIG. 8 is a vertical cross-sectional view of a convection type brazing apparatus according to another embodiment of the invention, taken along the line IV—IV of FIG. 10.

FIG. 7 is a schematic plan view of the preheating furnace 20, the brazing furnace 30 and the cooling furnace 50, each of which is provided with the fan 27, 37 and 57 respectively. Also, the preheating furnace 20 and the brazing furnace 30 are provided with the winding tube heater 26 and 36 respectively. The cooling furnace 50 is provided with the winding water-cooling pipe 56. 60 is a switching valve of the water-cooling pipe.

Inside an inlet of the tube heater 26 of the preheating furnace 20 a gas burner 28 is installed, to which propane gas to be used as a fuel is supplied from a fuel gas source 61 through a pipe 62 and an electromagnetic valve 64. 29 is an air intake. Inside an inlet of the tube heater 36 of the brazing furnace 30 the gas burner 66 is installed, to which propane gas is supplied from the fuel gas source 61 through a pipe 63 and an electromagnetic valve 65. 67 is an air intake.

Numeral 68 denotes a programmable controller provided with a sensor 69 and a timer 70, and an operation control unit incorporated in the controller 68 controls the aperture of the electromagnetic valve 65 according to a prescribed time schedule. In case where the brazing chamber temperature detected by the sensor 69 has deviated from a predetermined value, a correction control unit incorporated in the controller 68 corrects the predetermined value stored in the controller 68 according to the detected temperature.

Further, the controller 68 controls switching operation of the switching valves 38, 39 located in the upper duct 48 for switching the blowing phase and suspension phase of the uniform heating process. The controller 68 also controls the air pump of the aspirator 17 so as to operate during the suspension phase.

Numeral 85 denotes a cylinder of liquid nitrogen to be used as the thermal medium gas, which supplies nitrogen gas through a switching valve 84, a pipe 81, an electromagnetic valve 76 and a nozzle 72, to the preheating furnace 20. To the brazing furnace 30, the nitrogen gas is supplied from the cylinder 85 through the switching valve 84, a pipe 82, an electromagnetic valve 77, a preheating circuit 91, a three-way valve 71 and a nozzle 73, to the thermal medium gas heating chamber 45. 92 is a switching valve for opening/closing a pipe for directly connecting the pipe 82 with the three-way valve 71.

Numeral 86 denotes a programmable controller provided with a sensor 88 and a timer 87, and an operation control unit incorporated in the controller 86 controls the aperture of the electromagnetic valve 77 according to a prescribed time schedule. In case where the brazing chamber temperature detected by the sensor 88 has deviated from a predetermined value, a correction control unit incorporated in the controller 86 corrects the predetermined value stored in the controller 86 according to the detected temperature.

An aperture of the electromagnetic valve 77 located on the nitrogen gas supply pipe 82 is usually 20 to 30% when supplying the nitrogen gas. The nitrogen gas is heated up to approx. 100° C. at the preheating circuit 91, and supplied through the three-way valve 71 and the nozzle 73 into the thermal medium gas heating chamber 45. During the suspension phase of the uniform heating process the switching valve 92 is fully opened and the three-way valve is switched for the direction of the nozzle 16, so that the nitrogen gas is blown directly into the brazing chamber 40 through the nozzle 16.

Temperature of the nitrogen gas that has not passed through the preheating circuit 91 is approx. 20 to 50° C., therefore such low-temperature nitrogen gas can rapidly lower the furnace temperature during the suspension phase. Supply amount of the nitrogen gas is determined by feedback control of the controller 86 according to the brazing chamber temperature detected by the sensor 88, for properly adjusting the brazing chamber temperature.

The aspirator 17 is activated during the suspension phase by a control signal of the controller 68, and rapidly aspirates and removes the high-temperature heating medium gas out of the brazing chamber 40 to lower the furnace temperature. Accordingly, the aspirator 17 can rapidly lower the brazing chamber temperature in collaboration with the operation of the cooling medium gas injecting nozzle 16, therefore a cycle time of raising and lowering the brazing chamber temperature can be shortened, to increase uniform heating effect for the workpieces. Further, though two controllers 68 and 86 are employed in this embodiment, naturally it is also possible to use a single controller equipped with the functions of the both controllers.

To the cooling furnace 50, the nitrogen gas is supplied from the cylinder 85 through the switching valve 84, a pipe 83, an electromagnetic valve 78 and a nozzle 74. 75 is an air blowing nozzle for blowing cooling air supplied through a pump 79 and a pipe 89, into the cooling furnace 50.

Embodiment 2.

FIGS. 8 through 12 show a convection type brazing apparatus according to another embodiment, in which numeral 100 denotes a brazing furnace provided with a thermal medium gas heating chamber 101, a brazing chamber 102, a fan 103, a tube heater 104, heating medium gas injecting nozzles 105, a heating medium gas supplying path 106 through which the heating medium gas is supplied from the thermal medium gas heating chamber 101 to the heating medium gas injecting nozzles 105, a bypass circulation path 107 through which the heating medium gas is directly returned to the thermal medium gas heating chamber 101 during the suspension phase, a manifold 108 (in FIG. 9) for the injecting nozzles 105, a damper 109 for switching the heating medium gas supplying path 106 and the bypass circulation path 107, a communicating path 110 connecting the heating chamber 101 with the heating medium gas supplying path 106, an exhaust gas outlet 111 for returning the exhaust gas in the brazing chamber to the heating chamber 101, a gate 112 located halfway of the heating medium gas circulation path, a damper 113 for opening/closing the exhaust gas outlet, a shutter 120 of the brazing furnace 100 and a motor 121 for the fan 103.

Figure 9:
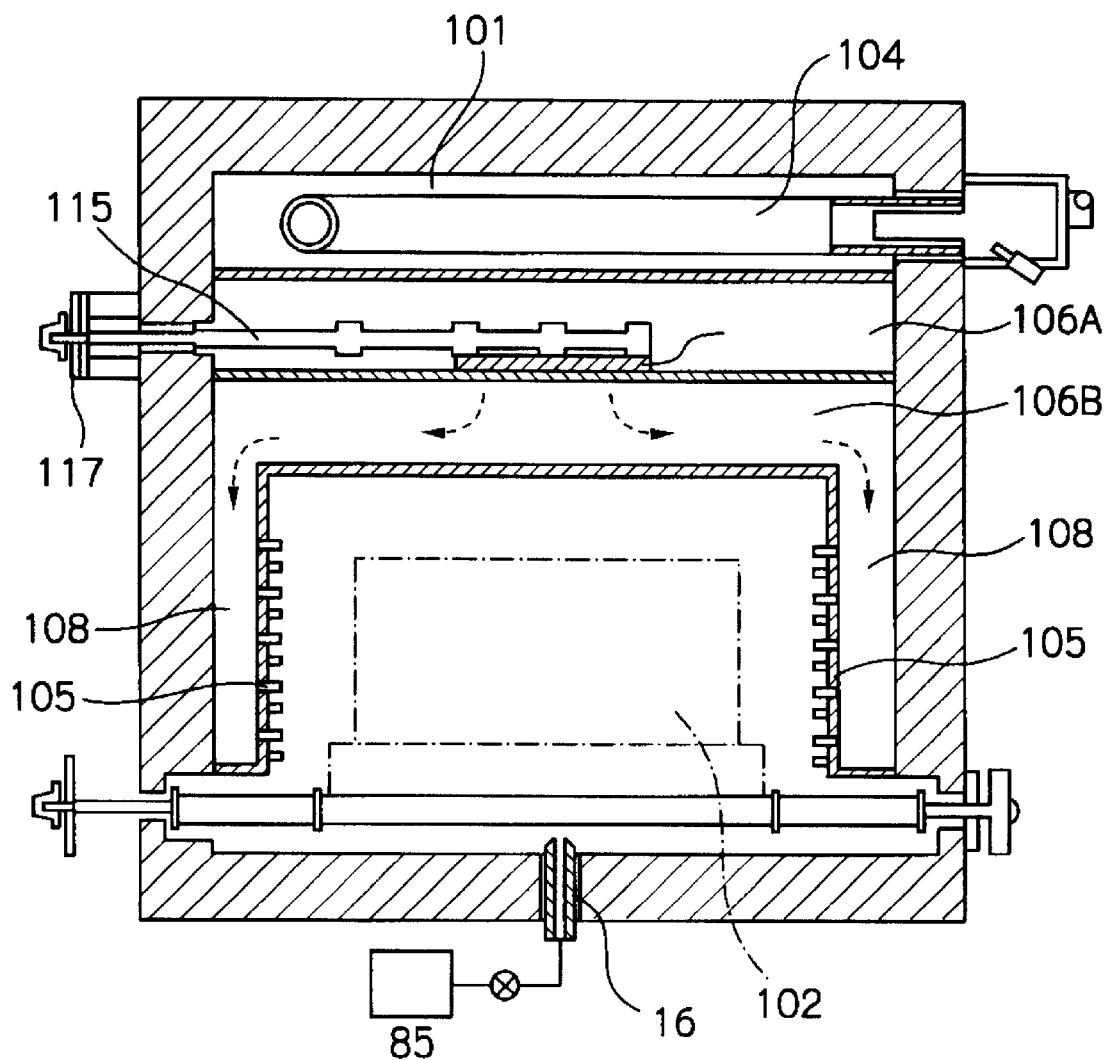
FIG. 9 is a vertical cross-sectional view taken along the line V—V of FIG. 10.

In FIG. 9, numeral 16 denotes an injecting nozzle of cooling medium gas for example nitrogen gas; 85 a cylinder of the nitrogen gas; 106A an upstream path anterior to the damper 109 of the heating medium gas supplying path 106 and 106B a downstream path posterior to the gate 112.

Figure 10:
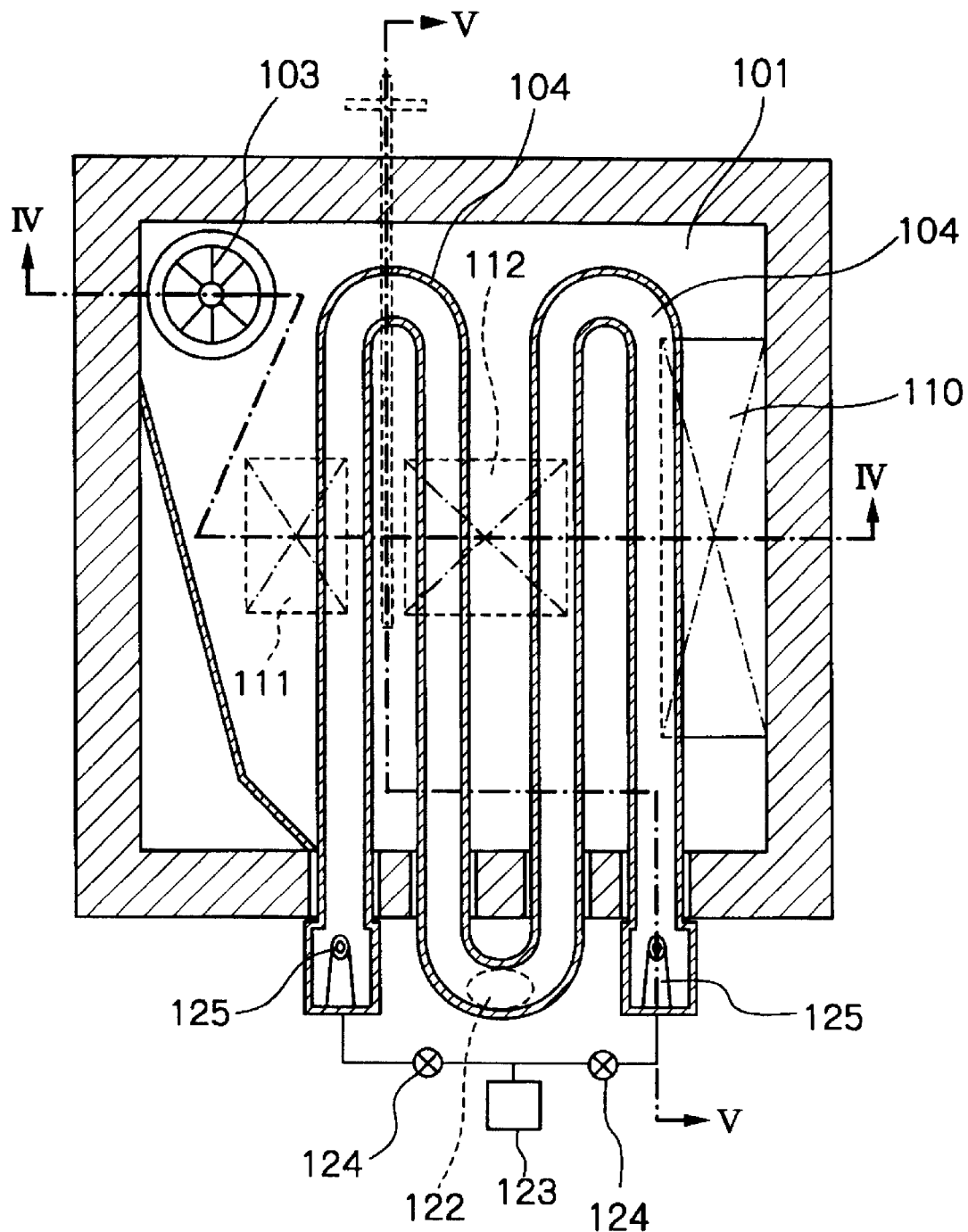
FIG. 10 is a horizontal cross-sectional view taken along the line VI—VI of FIG. 8.

In FIG. 10, numeral 122 denotes a chimney used in common for the two tube heaters 104, 104; 123 a fuel gas source; 124 a switching valve and 125 a gas burner.

Figure 11:
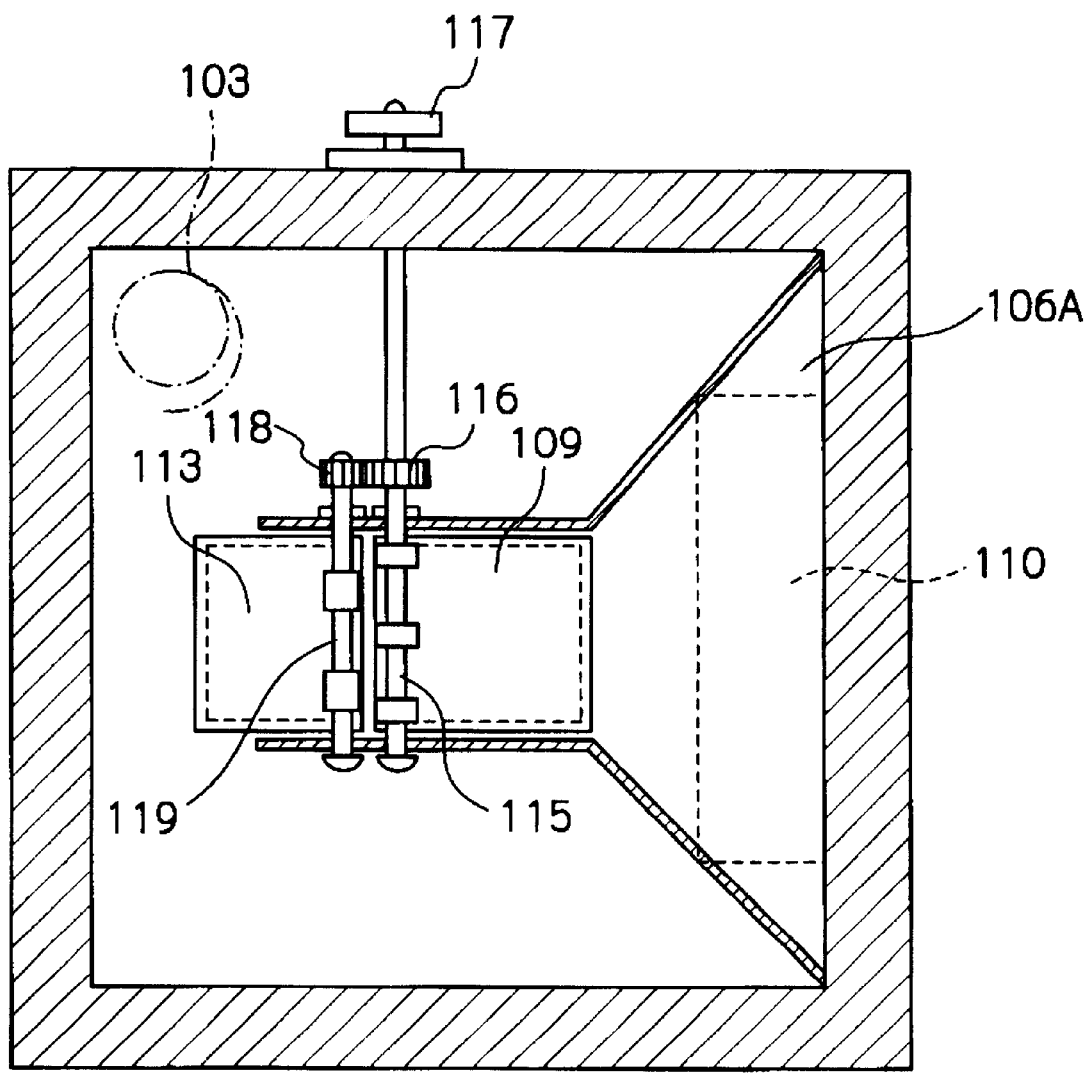
FIG. 11 is a horizontal cross-sectional view taken along the line VII—VII of FIG. 8.

In FIG. 11, numeral 115 denotes a rotational axle for the damper 109; 116 a gear fixed to the rotational axle 115; 117 a pulley for transmitting a rotary motion to the rotational axle 115; and 118 another gear engaged with the gear 116, of a smaller diameter than the gear 116. 119 is a rotational axle of the damper 113, to which the gear 118 is fixed.

With a rotation of the pulley 117 the rotational axle 115 rotates, causing the damper 109 to open or close so that the gate 112 located halfway of the heating medium gas supplying path 106 is opened or closed. With the rotation of the rotational axle 115 the gear 118 that is engaged with the gear 116 is caused to rotate, causing also the rotational axle 119 to rotate since the gear 118 is fixed to the rotational axle 119. The rotation of the rotational axle 119 causes the damper 113 to rotate so as to open or close the exhaust gas outlet 111.

According to this embodiment, the damper 109 closes the gate 112 and opens the bypass circulation path 107 during the suspension phase, so that the heating medium gas heated in the heating chamber 101 directly returns to the heating chamber 101 through the bypass circulation path 107 and the fan 103. Therefore, the operation can be continued without suspending the heating of the tube heater 104 or discharging the heating medium gas outside during the suspension phase, and consequently the workpieces can be intermittently heated in a short pulse cycle, resulting in an increased uniform heating effect of the workpieces.

Also, the damper 109 is designed to open or close not only the gate 112 of the heating medium gas supplying path but also the bypass circulation path 107, therefore a single opening/closing mechanism can be used for controlling both of these paths.

Figure 12:
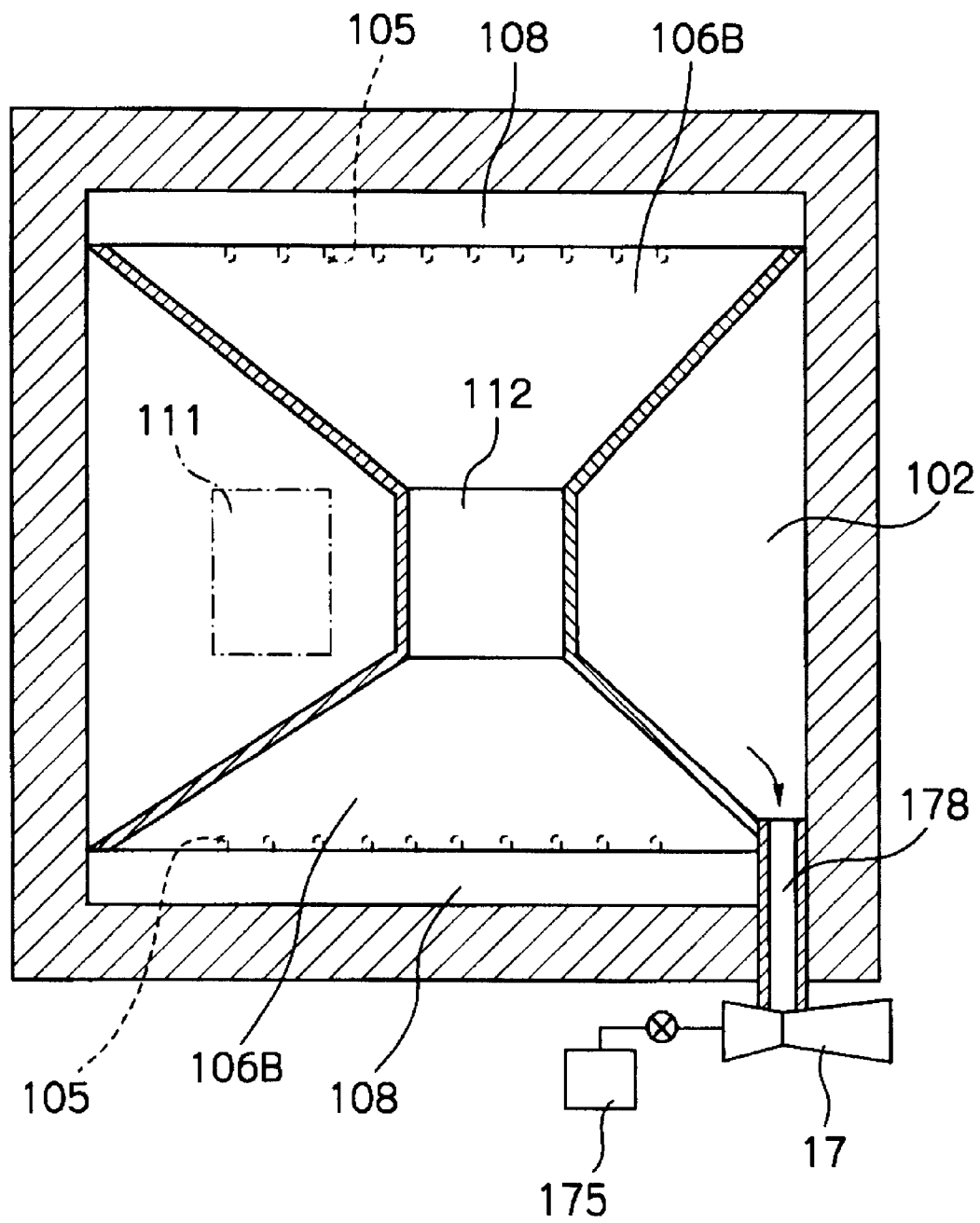
FIG. 12 is a horizontal cross-sectional view taken along the line VIII—VIII of FIG. 8.

Further, in FIG. 12 numeral 17 denotes an aspirator; 178 a suction pipe of the aspirator that has an opening in the brazing chamber 102; and 175 an air pump. The aspirator 17 has a similar constitution to FIGS. 5 and 6 of the first embodiment.

Also, the fan 103 is located on the upstream side of the tube heater 104. By such configuration the heating medium gas having a reduced volume owing to a temperature drop after heating the workpieces in the brazing chamber 102 is pressed toward the heating chamber 101, therefore ventilating efficiency of the fan 103 is improved, and resultantly thermal transfer efficiency of the tube heater 104 is improved so that a high-temperature heating medium gas can be obtained in a short time.

Embodiment 3.

Figure 13:
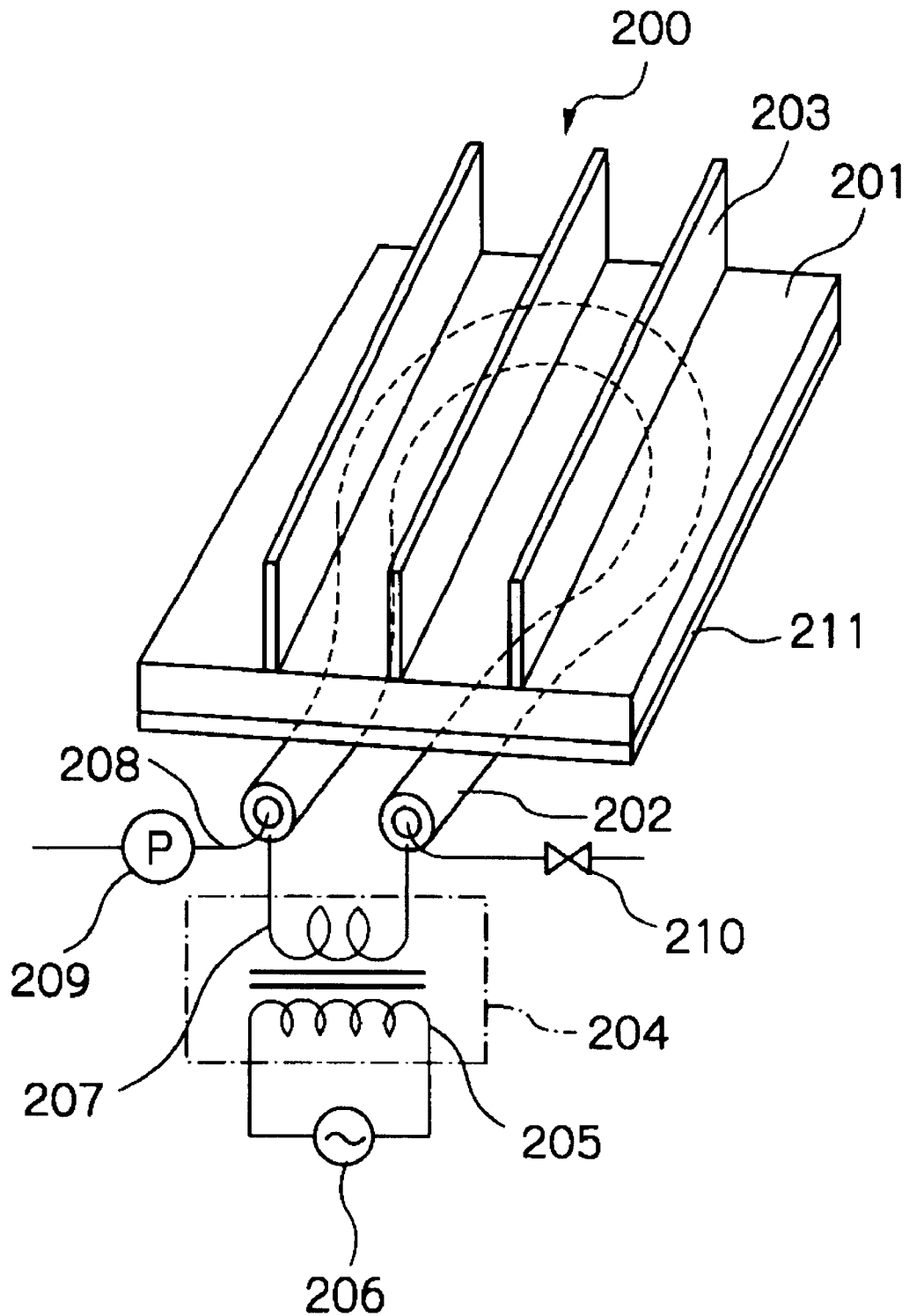
FIG. 13 is a perspective view showing another embodiment of means for heating thermal medium gas.

FIG. 13 shows another embodiment wherein a high-frequency heating device 200 is employed as means for heating thermal medium gas in the thermal medium gas heating chamber 45. Numeral 201 stands for a heating plate made of a highly inductive material such as stainless steel etc.; 202 a water jacket coil made of copper; and 203 a multitude of fins made of the same material as the heating plate 201 erectly attached to the heating plate 201. 204 is a high-frequency transformer; 205 a primary coil connected with an AC power source 206; and 207 a secondary coil. 208 is a water supply pipe; 209 a pump; 210 a switching valve; and 211 an insulating plate.

Alternate current supplied by the AC power source 206 is converted into high-frequency current by the high-frequency transformer 204 and supplied to the secondary coil 207. High-frequency current generated by the secondary coil 207 flows to the water jacket coil 202 and heats the heating plate 201 by high-frequency electromagnetic wave through the insulating plate 211 placed therebetween. Heat of the heating plate 201 is conducted to a thermal medium gas through the fins 203.

FIG. 13 illustrates the fin group 203 of a flat thin plate shape, while it is also effective to design the fins in a different shape such as corrugated shape, or to arrange them in a different configuration such as hound's tooth pattern, for the purpose of increasing thermal conductivity from the fin group 203 to the thermal medium gas.

Using such high-frequency heating device provides the advantage of faster heating speed and shorter on/off cycle time of the heating medium gas thus improving operation efficiency, and is effective in prevention of air pollution since the device does not generate exhaust gas through the operation.

<Brazing process>

As shown in FIG. 1, the workpieces W consisting of an aluminum flat tube having aluminum fins clad with a brazing material assembled on its both faces and coated with a flux are stacked in several layers on the tray T, and are dried by nitrogen gas in the drying furnace 10, and then carried into the preheating furnace by the belt conveyors 15, 25. The workpieces W are then preheated up to approx. 350° C. by nitrogen gas that is the heating medium gas heated by the tube heater 26.

The preheated workpieces W are carried into the brazing furnace 30 by the belt conveyors 25, 35, to be heated up to approx. 600° C. that is the predetermined temperature for brazing, by the heating medium gas heated by the tube heater 36. When the workpieces temperature has reached the predetermined temperature for brazing, the damper of the heating medium gas circulation path is opened and closed so that the heating medium gas is intermittently blown into the brazing chamber, and the brazing is executed through a uniform heating process during which the brazing chamber temperature is varied up and downward in a short cycle and in small increments.

Figure 14:
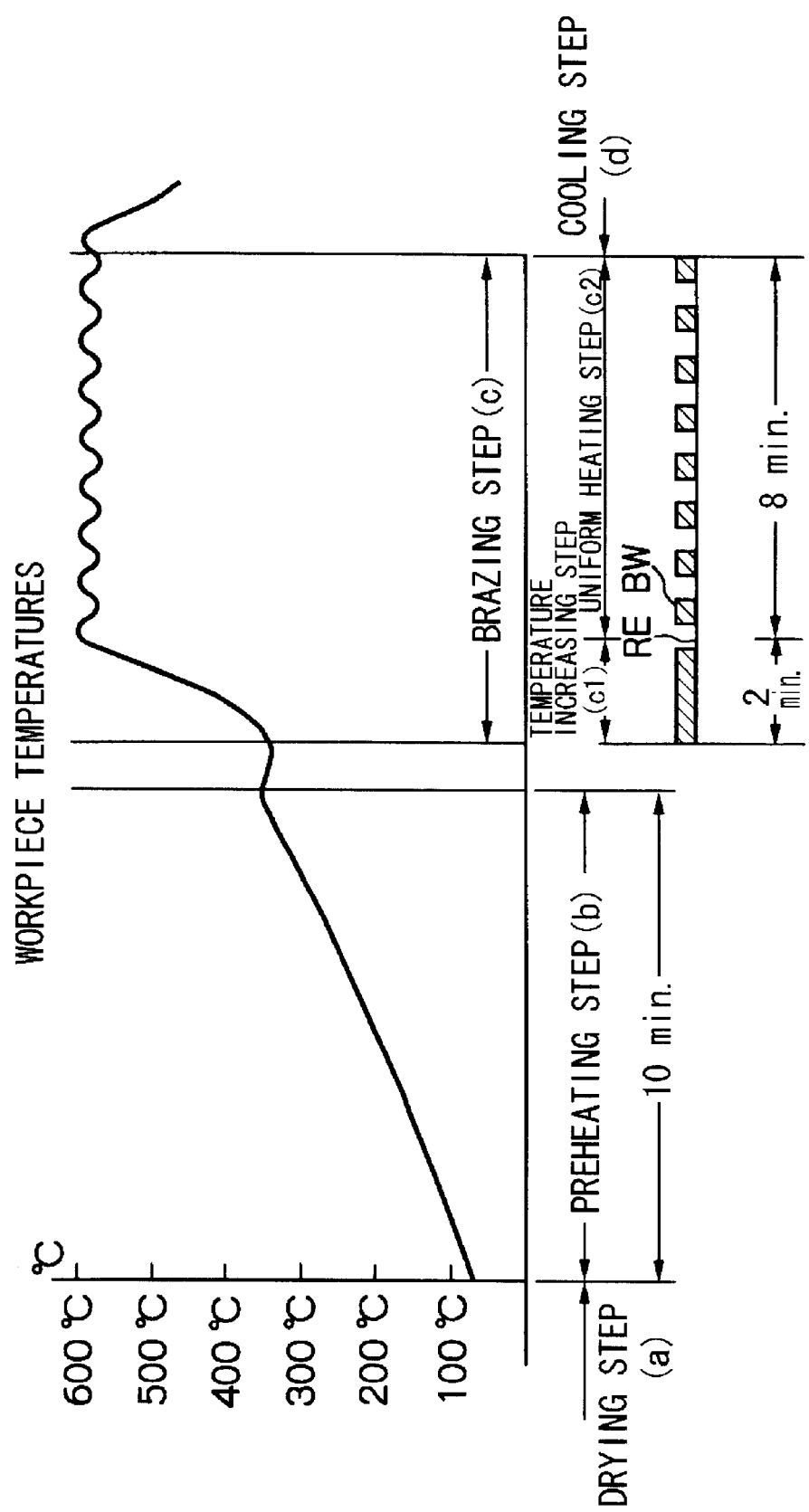
FIG. 14 is an explanatory graph showing surface temperature transition of workpieces during preheating and brazing process.

FIG. 14 is a graph showing a transition of actually measured surface temperature of workpieces heated by heating medium gas blown from two opposing directions. In case where each process is to be performed for 10 minutes, the workpieces that have been dried and slightly heated in a drying process (a) are heated up to approx. 350° C. at the surface thereof during a preheating process (b).

The workpieces that have been transferred from the preheating furnace to the brazing furnace but slightly cooled in the transition go through a brazing process (c) in the brazing furnace. The first two minutes is a temperature raising process (c1) during which the heating medium gas is continuously blown from two opposing directions, to heat up the workpieces.

When the workpieces temperature has reached approx. 600° C., the process advances to a uniform heating process (c2). Timing to start the uniform heating process is determined by the programmable controller 68 when the brazing chamber temperature detected by the sensor 69 has reached a predetermined value. During this process, suspension of blowing (suspension phase, SP) and blowing (blowing phase, BW) of the heating medium gas are alternately performed according to a time schedule prescribed in the controller 68.

During the suspension phase a cooling medium gas is blown from the nozzle 16 directly into the brazing chamber 40, while simultaneously the aspirator 17 aspirates and removes the high-temperature heating medium gas our of the brazing chamber 40, so as to rapidly lower the brazing chamber temperature.

For controlling the brazing chamber temperature, such methods as adjusting fuel supply amount for the tube heater, adjusting the low-temperature thermal medium gas amount to be directly blown into the brazing chamber, or varying a time ratio of the blowing phase and suspension phase during the uniform heating process may be employed. Any of these methods may be independently employed, while it is also effective to combine two or more of them.

The workpieces that have completely gone through the brazing process are transferred to a cooling process (d), to be rapidly cooled by a low-temperature thermal medium gas, water-cooling pipe and air blow.

<Effect of the Heating Medium Gas Injecting Nozzles>

FIG. 15 is a table showing actually measured flow velocity of the heating medium gas in the ordinary temperature injected from the heating medium gas injecting nozzles 43, in a brazing furnace with seven vertical rows and five horizontal rows of nozzles aligned on each of two opposing walls. According to these actually measured values the maximum value is 14.5 m/s and the minimum value 11.0 m/s, i.e. the error range is as small as 12.75±1.75 m/s, in view of which it is to be understood that deviation in an injecting wall is minimal. In other words, it has been proven that the heating medium gas is uniformly blown to the workpieces.

<Working Example>

Apparatus: An index type convection furnace provided with a preheating furnace, a brazing furnace and a cooling furnace consecutively installed.

Brazing furnace: Inner measurement 1200 mm wide× 1200 mm deep and 650 mm high

Heating system: Tube heater containing therein a propane gas burner

Workpieces: A radiator part made of AA3003 aluminum on which fins of AA3003 aluminum clad with AA4045 silicon alloy are assembled.

Flux: A fluoride flux

Preheating temperature: 350° C.±50° C.

Brazing temperature: 600° C.±10° C.

Temperature of the heating medium gas in the thermal medium gas heating chamber: 700–750° C.

Cycle time: 10–15 seconds

Time ratio of a blowing phase and suspension phase of the heating medium gas: 50:50 (Standard ratio 50:50, subject to subsequent adjustment depending on finish quality)

Brazing time (Time of retention in the brazing furnace) 5 to 20 minutes

Amount and temperature of gas to be blown in: 15 cubic meters per hour, temperature 600–620° C.

Amount and temperature of cooling medium gas (nitrogen gas) to be blown in during the suspension phase: 15 cubic meters per hour, temperature 20° C.

Defective rate (out of 100 workpieces): 0

<Conventional Method>

Brazing time without performing the pulse heating: 30 minutes

Defective rate (out of 2,000 workpieces): approx. 3%.

As a result of introducing a uniform heating process in which a blowing phase for blowing a heating medium gas into a brazing chamber and a suspension phase for suspending the blow of the heating medium gas into the brazing chamber are alternately switched after workpieces temperature has reached a predetermined temperature for brazing in an index type convection furnace, quality deterioration due to overheating of the surface of the workpieces can be prevented and tri-dimensional temperature slope of the workpieces can be eliminated so as to improve brazing quality, and besides an operation time for brazing can be shortened to less than a half, thus achieving a higher energy-saving effect.

Also, as a result of providing a heating medium gas circulation path switching mechanism for periodically switching the heating medium gas circulation path as means for uniform heating, and a bypass circulation path located halfway of the heating medium gas circulation path, through which the heating medium gas is returned directly to the thermal medium gas heating chamber without passing through the brazing chamber, the heating medium gas temperature can be simply but precisely controlled, without applying a major modification to a conventional apparatus. In addition to that the consumption of the heating medium gas (nitrogen gas) can be reduced to about one sixth as compared with a muffle furnace.

Also, by blowing a cooling medium gas directly into the brazing chamber during the suspension phase and providing an aspirator for aspirating and removing the high-temperature heating medium gas out of the brazing chamber as means for uniform heating, the brazing chamber temperature can be rapidly lowered and a cycle time for varying the brazing chamber temperature up and downward can be shortened, resulting in a substantially shorter operation time.

Further, as a result of providing a multitude of nozzles directed toward the workpieces on inner walls of the brazing chamber as means for blowing the heating medium gas, the heating medium gas is blown uniformly all over each side of the workpieces, so that the surface of the workpieces is uniformly heated up.

Furthermore, since the convection furnace according to the invention is of an index type wherein all of the drying furnace, preheating furnace, brazing furnace and cooling furnace are respectively separated by doors and sealed, temperature and dew point in each furnace can be easily controlled. In addition, by intermittently blowing the heating medium gas in a short cycle, partial overheating and tri-dimensional temperature slope of the workpieces can be minimized, and escape of flux due to local overheating can also be prevented, and resultantly consumption of flux is reduced to about one third, while still achieving a high-quality brazing result.

What is claimed is:

1. A convection type brazing apparatus for metal workpieces having a brazing furnace provided with at least a thermal medium gas heating chamber, a brazing chamber and a heating medium gas circulation path through which said heating medium gas heated in said thermal medium gas heating chamber returns to said thermal medium gas heating chamber via said brazing chamber, comprising:

a heating medium gas circulation path switching mechanism for periodically switching said heating medium gas circulation path so that a blowing phase during which said heating medium gas heated in said thermal medium gas heating chamber is blown into said brazing chamber and a suspension phase during which blow of said heating medium gas into said brazing chamber is suspended are alternately repeated; and a bypass circulation path through which said heating medium gas returns directly to said thermal medium gas heating chamber halfway of said heating medium gas circulation path without running through said brazing chamber during said suspension phase.

2. The convection type brazing apparatus for metal workpieces as set forth in claim 1, further comprising means for controlling said heating medium gas circulation path switching mechanism, for closing said bypass circulation path while said heating medium gas circulation path is opened during said blowing phase and opening said bypass circulation path while said heating medium gas circulation path is closed during said suspension phase.

3. The convection type brazing apparatus for metal workpieces as set forth in claim 2, wherein said heating medium gas circulation path switching mechanism controlling means is provided with a function to set a cycle time of said blowing phase and said suspension phase of said heating medium gas circulation path in a range of 5 seconds to 5 minutes.

4. The convection type brazing apparatus for metal workpieces as set forth in claim 3, wherein said heating medium gas circulation path switching mechanism controlling means comprises means for correction for executing feedback control of a ratio of said blowing phase and said suspension phase in accordance with a temperature inside said brazing chamber.

5. The convection type brazing apparatus for metal workpieces as set forth in claim 1, wherein said brazing chamber comprises means for introducing a cooling medium gas, by which a cooling medium gas is introduced into said brazing chamber during said suspension phase of said blow of said heating medium gas.

6. The convection type brazing apparatus for metal workpieces as set forth in claim 1, wherein said brazing chamber comprises means for discharging exhaust heating gas to be activated during said suspension phase of said blow of said heating medium gas.

7. The convection type brazing apparatus for metal workpieces as set forth in claim 6, wherein said exhaust heating gas discharging means comprises a venturi tube to be operated by compressed air located on the exit side of a discharging tube having an opening in said brazing chamber.

8. The convection type brazing apparatus for metal workpieces as set forth in claim 1, wherein said thermal medium gas heating chamber comprises a tube heater for heating said heating medium gas.

9. The convection type brazing apparatus for metal workpieces as set forth in claim 1, wherein said thermal medium gas heating chamber comprises a high-frequency induction heating device having a multitude of radiating projections for heating said heating medium gas.

10. The convection type brazing apparatus for metal workpieces as set forth in claim 1, wherein said brazing chamber comprises a heating medium gas blowing means for blowing said heating medium gas onto metal workpieces set inside said brazing chamber.

11. The convection type brazing apparatus for metal workpieces as set forth in claim 10, wherein said heating medium gas blowing means is attached to an inner wall of said brazing chamber and comprises a multitude of nozzles directed toward said workpieces.

12. The convection type brazing apparatus for metal workpieces as set forth in claim 11, wherein said each nozzle of said heating medium gas blowing means is constructed so that the blowing direction of said heating medium gas can be adjusted freely.

13. The convection type brazing apparatus for metal workpieces as set forth in claim 11, wherein said multitude of nozzles are regularly aligned on said inner wall of said brazing chamber.

14. The convection type brazing apparatus for metal workpieces as set forth in claim 10, wherein said heating medium gas blowing means are attached to opposing inner walls of said brazing chamber so as to confront each other.

* * * * *